United States Patent [19]
Walter

[11] 4,106,603
[45] Aug. 15, 1978

[54] ARRANGEMENT FOR DRIVING A WORKING SHAFT BY TWO COMBUSTION ENGINES

[75] Inventor: Jürgen Walter, Wanne-Eickel, Fed. Rep. of Germany

[73] Assignee: Vulkan Kupplungs -und Getriebebau Bernhard Hackforth, Wanne-Eickel, Fed. Rep. of Germany

[21] Appl. No.: 669,879

[22] Filed: Mar. 24, 1976

[30] Foreign Application Priority Data

Mar. 29, 1975 [DE] Fed. Rep. of Germany ....... 2514029

[51] Int. Cl.$^2$ ........................................... B63H 23/30
[52] U.S. Cl. ................................. 192/85 AB; 74/661; 192/55; 192/106.1; 192/DIG. 2
[58] Field of Search ................. 74/661, 665 R, 665 A, 74/665 B, 665 K; 192/55, 85 AB, 88 A, 106.1, 110 B, DIG. 2

[56] References Cited

U.S. PATENT DOCUMENTS

| | | | |
|---|---|---|---|
| 1,492,862 | 5/1924 | Smith | 192/106.1 |
| 1,896,968 | 2/1933 | Paton | 192/55 |
| 3,196,714 | 7/1965 | Lundstrom | 74/665 R |
| 3,460,656 | 8/1969 | Swanson | 74/661 |
| 3,669,230 | 6/1972 | Burkhardt et al. | 74/661 |
| 3,777,865 | 12/1973 | Walter et al. | 192/85 AB |
| 4,022,083 | 5/1977 | Pollak-Banda et al. | 74/665 B |

FOREIGN PATENT DOCUMENTS

232,682  5/1959  Australia ................. 192/106.1

*Primary Examiner*—Stephen C. Bentley
*Attorney, Agent, or Firm*—Toren, McGeady and Stanger

[57] ABSTRACT

A transmission system for transmitting drive from at least two internal combustion engines to a single shaft comprises a clutch associated with each engine, an intermediate shaft connected to the hub part of each clutch and, in use, connected to its associated engine through a flexible coupling, a hollow shaft connected co-axially to the housing of each clutch, the intermediate shaft extending along and through its associated hollow shaft so that each clutch is remote from its associated engine. Each hollow shaft passes through a common gear housing and carries a gear wheel, the gear wheels on the hollow shafts meshing with a gear train in the gear housing to drive the driven shaft. The movable friction surfaces of each clutch are connected yieldingly to the hub parts of each clutch so that they are movable in all directions with respect to the hub parts of each clutch, and the hub parts of each clutch are centered substantially non-yieldingly in a radial direction on the clutch axis by a rolling bearing having its inner ring fixed to one of the clutch parts and its outer ring having an axially curved outer surface engaging the other clutch part through a thin resilient cushion, so that, in use, movements of the intermediate shaft through a small solid angle with respect to the hollow shaft are permitted. This system overcomes the misalignments, particularly those caused by thermal expansion and contraction, where two engines are mounted side by side.

10 Claims, 3 Drawing Figures

ARRANGEMENT FOR DRIVING A WORKING SHAFT BY TWO COMBUSTION ENGINES

The invention relates to a transmission system for transmitting drive from at least two internal combustion engines to a driven shaft.

A convenient way of arranging the drive from at least two internal combustion engines, particularly if the engines are arranged side by side, is one in which the drive going from each engine is taken through a flexible coupling to an intermediate shaft and thence to a clutch. The output from each clutch is taken through a hollow shaft to which is fixed a driving gear wheel. The driving gear wheels on each shaft are enclosed in a gear housing and mesh with a gear train itself taking drive to the driven shaft. The intermediate shaft leading to each clutch is arranged so that it extends through the hollow shaft leading away from that clutch with the clutch remote from the engine.

In transmission systems of this kind the flexible couplings have a number of functions. In the first place they help to damp out fluctuations in the torque which are unavoidable in the operation of internal combustion engines and they help absorb the impact loads which occur during engagement and disengagement of the clutch. They also compensate for changes in the lengths of shafts which are coaxially coupled together during changing operating conditions. They also compensate for parallel displacements of the hollow driving shafts, which are usually supported in bearings in opposed walls of the gear housing, due to changes in the temperature of the gear housing or any flexing resulting from operating conditions.

The clutches allow the individual engines to be engaged and disengaged while the engines are running, so that the driven shaft, that is to say the working shaft, can be driven by either of the two engines or by both. In most previous systems each clutch is positioned just behind the flexible coupling, that is to say in between the engine and the gear housing. But, particularly in propeller drives for ships, the requirement for the greatest possible compactness and the best utilization of the available space makes it preferable to locate the clutch on the far side of the gear housing, away from the engine as described above. To make this possible the driving gear wheel of the gear train is mounted on a hollow shaft which passes through the gear housing and is supported by two bearings in the walls of the gear housing. The intermediate shaft which passes through the interior of the hollow shaft has previously been supported by two bearings in the hollow shaft.

Technological developments have constantly increased the power which has to be transmitted, and consequently the drive components have increased in size with a resulting increase in the distance between the shafts of the two engines. Similarly the distance between the hollow shafts has increased, with the result that thermal effects produce greater variation in this distance, by parallel displacement of the hollow shafts, tending to put the hollow shafts, and consequently the intermediate shafts which they contain, out of alignment with the engine shafts. These variations are such that the flexible couplings can no longer compensate adequately.

Attempts to reduce the radial stressing of the flexible couplings and the bend stressing of the intermediate shafts have taken the form of attempts to relieve the intermediate shafts of bearing constraint by connecting them through pivot joints, at one end to the flexible coupling and at the other end by a self-aligning bearing in the hollow shaft. The results of these attempts have not been satisfactory. A difficulty is that a self-aligning bearing, located in the hollow shaft does not have ready access to the usual lubrication system, and cannot therefore be supplied with lubricant easily. Furthermore since the far end of the intermediate shaft, which projects out beyond the self-aligning bearing, and which is connected to the hub part of the clutch, makes an angle with the geometric axis of the hollow shaft and it becomes necessary to use a yielding clutch which is costly in construction. The hub part of the clutch performs a gyrating movement about the axis of the clutch and its axis describes a conical surface whose apex is in the centre of the self-aligning bearing, that is to say not in the clutch. The flexible couplings take the resulting radial stresses only when the clutch is engaged. When the clutch is disengaged the parts of the clutch which move during engagement and disengagement of the clutch share the gyrating movement of the hub part and consequently rub against the clutch housing friction surfaces.

Attempts have been made to do without the self-aligning bearing by connecting the hollow shaft to the clutch housing through a hypoid-tooth coupling, to act as a pivot joint. This does relieve the intermediate shaft and the hub part of the clutch from transverse loads, but it becomes necessary to use a clutch whose hub parts are centred unyieldingly on the axis of the clutch housing to take the weight of the intermediate shaft. The hub part can, for example, be a multi-disc arrangement. This increases, in conjunction with the hypoid-tooth coupling between the clutch housing and the hollow shaft, both bulkiness and cost.

The invention in the present invention, starting out from the device mentioned at the beginning, is to provide a support for the intermediate shaft which allows a simple kind of clutch to be used and makes it unnecessary to use a pivot joint of any kind between the clutch housing and the hollow shaft.

According to this invention, a transmission system for transmitting drive from at least two internal combustion engines comprises a clutch associated with each engine, an intermediate shaft connected to the hub part of each clutch and, in use, connected to its associated engine through a flexible coupling, a hollow shaft connected co-axially to the housing of each clutch, the intermediate shaft extending along and through its associated hollow shaft so that each clutch is remote from its associated engine, each hollow shaft passing through a common gear housing and carrying a gear wheel, and the gear wheels on the hollow shafts meshing with a gear train in the gear housing to drive the driven shaft, the movable friction surfaces of each clutch being connected yieldingly to the hub part of each clutch so that they are movable in all directions with respect to the hub part of each clutch, and the hub part of each clutch being centred substantially non-yieldingly in a radial direction on the clutch axis by a rolling bearing having its inner ring fixed to one of the clutch parts and its outer ring having a curved outer surface engaging the other clutch part through a thin resilient cushion, so that, in use, movements of the intermediate shaft through a small solid angle with respect to the hollow shaft are permitted.

This centring of the hub on the clutch axis prevents the hub part from shifting radially, when the clutch is disengaged, due to the weight of the long and consequently heavy intermediate shaft, and ensures constant spacing of the movable clutch members from the housing, only a small gap being now required. The arrangement nevertheless still permits small angular movements of the hub part relative to the axis of the clutch.

Supporting the intermediate shaft only at its two ends has the result that parallel relative displacement of the axes of the flexible coupling and clutch merely has the effect that the intermediate shaft adopts a slightly slanting attitude with respect to the hollow shaft. As the intermediate shaft is quite long the angle of slant is only a fraction of a degree and this can easily be taken up by the flexible couplings and the connection between the hub and the housing of the clutches themselves. The same thing applies to the resilient cushion mounted on the domed outer surface of the outer roller bearing ring. The pendulum-like oscillations due to the slant of the intermediate shaft produce only axial stresses in the cushion, which can therefore be quite thin and consequently practically unyielding radially.

For the purposes of the present invention there can for example be used a clutch of simple construction and comparatively small size, of a basic type known per se, whose axially moving friction surfaces are connected to the hub part through radially stiff and elastically flexible stressed elements, which not only move axially, during actuation of the clutch, but also permit the hub part to move through small angles relative to the stressed elements and relative to the clutch housing. The clutch friction surfaces move on straight lines axially whereas the outer edges of the stressed elements follow curved paths. These different movements are permitted in that the clutch members are connected to the stressed elements by rubber bodies which are yielding in all directions. It should be observed that this basic type of clutch is intended to function only if its hub part is connected to a shaft rotating in bearings and centred positively on the axis of the clutch housing, the fact that in the present case the hub part is not so connected makes it necessary to provide the arrangements of the present invention, to prevent the radial displacement of the movable friction surfaces.

Two examples of transmission systems in accordance with this invention are represented diagrammatically in the drawings, in which.

Figure 1:
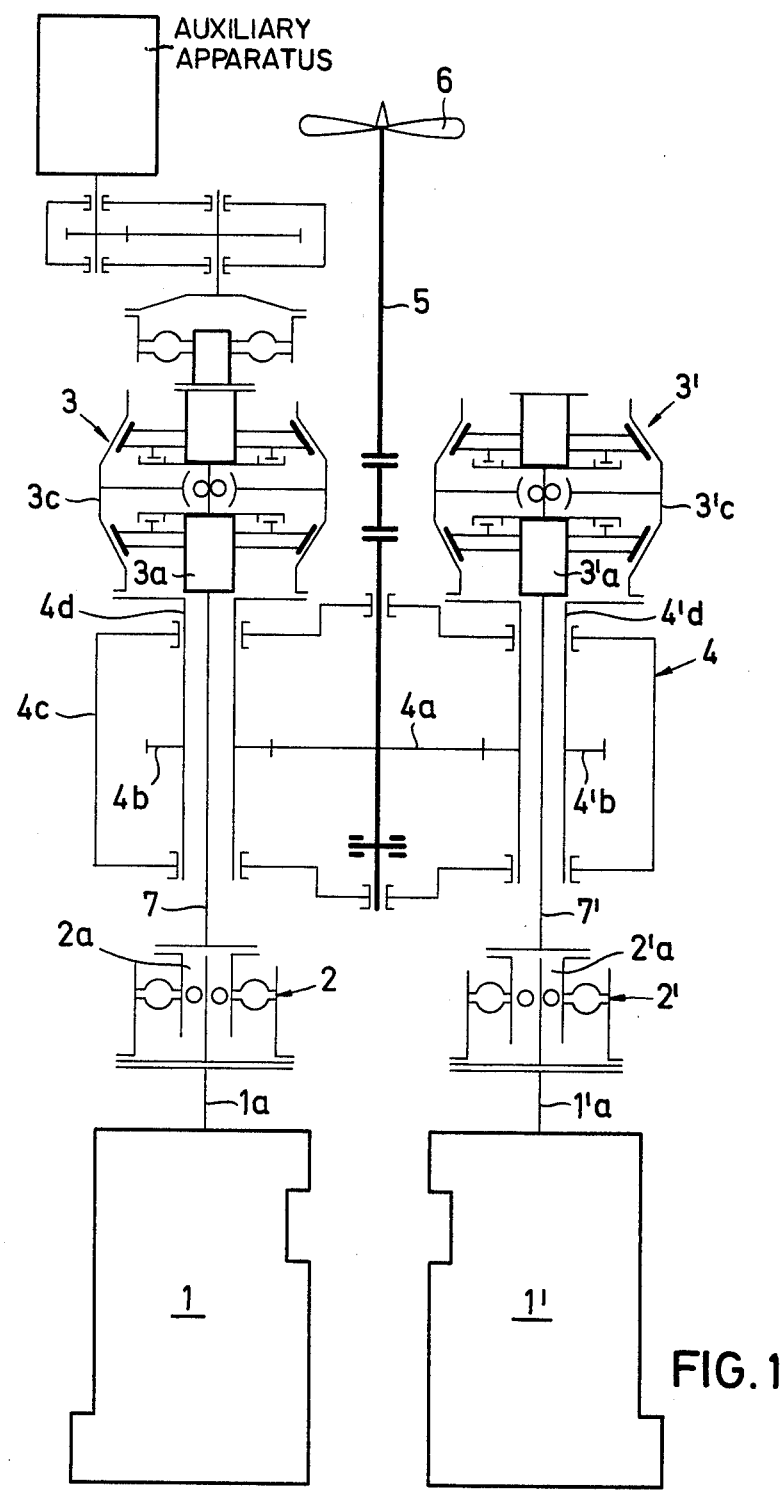
FIG. 1 is a diagram of a transmission system for driving a propeller shaft of a ship from two internal combustion engines positioned side by side.

In the system shown in FIG. 1 two internal combustion engines 1, 1' which drive a driven shaft 5 through a transmission system comprising engine shafts 1a, 1'a, flexible couplings 2, 2', intermediate shafts 7, 7', clutches 3, 3', gear wheels 4b, 4'b and a gear wheel 4a situated in a gear housing 4c. The driven shaft 5 in this example is a propeller shaft of a ship and has a propeller 6 fixed to its end remote from the engines. The driven shaft 5 can be driven selectively by either or both of the two engines. The clutches 3, 3' are located at the side of the gear housing 4c opposite from the engines 1 and 1'.

Hub parts 2a, 2'a of the flexible couplings 2, 2' are connected rigidly to hub parts 3a, 3'a of the clutches 3, 3' by the intermediate shafts 7, 7'. Each intermediate shaft passes through the middle of a hollow shaft 4d, 4'd, without touching it. Each hollow shaft passes through the gear housing 4c and is supported in bearings in opposite walls of the gear housing 4c. Each hollow shaft has one of the gear wheels 4b and 4'b fixed to it which meshes with the gear wheel 4a fixed to the driven shaft 5. Furthermore, each hollow shaft is directly fixed to the housing 3c, 3'c of the clutch 3 or 3'.

Figure 2:
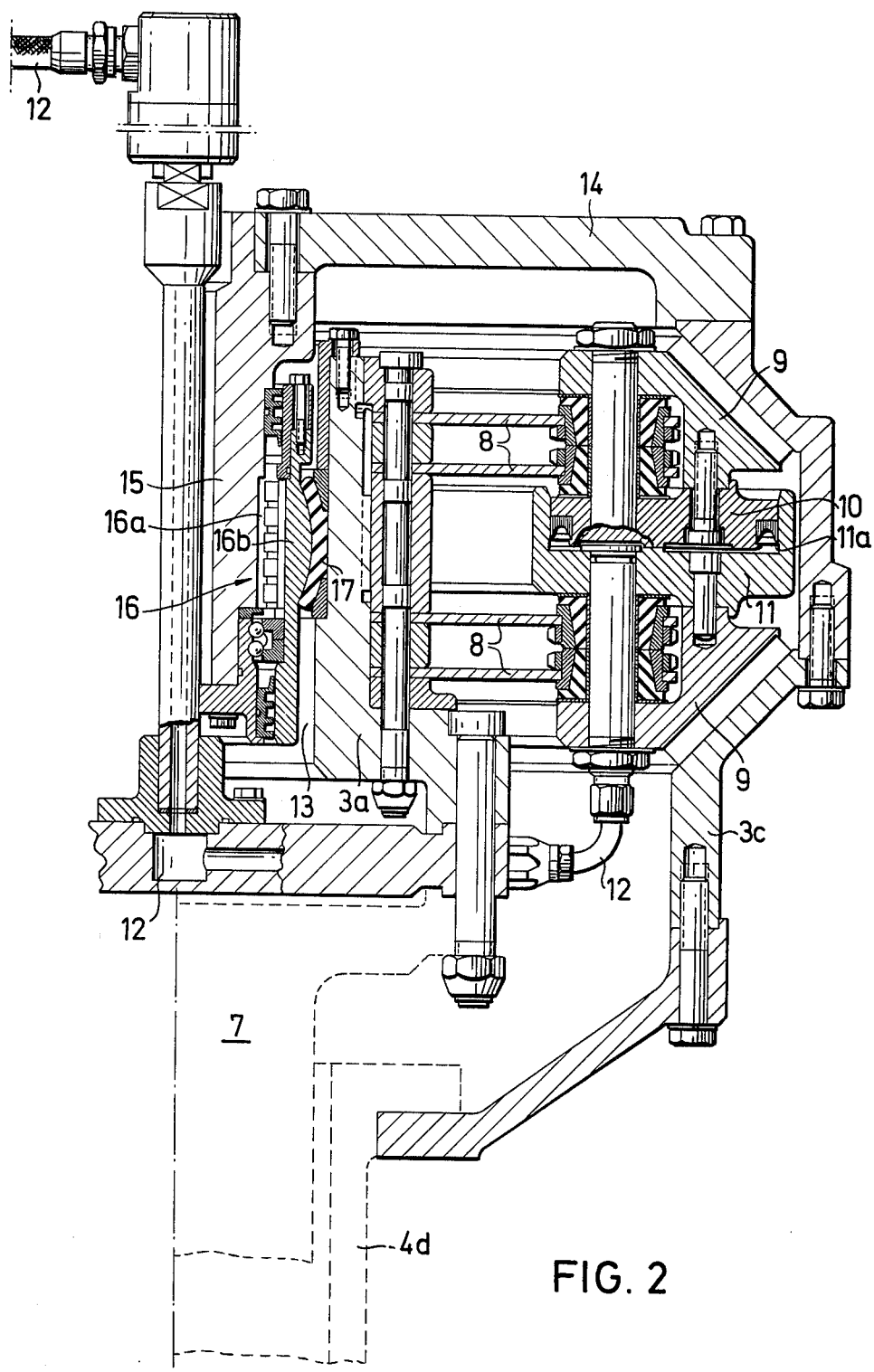
FIG. 2 is a radial section taken along the axis of a first example of a clutch arranged to be used with the present invention; and, FIG. 3 is a diametric section taken along the axis of a second example of a clutch arranged to be used with the present invention.

FIG. 2 shows an example of a clutch which can be used in the system of FIG. 1. This is a pneumatically or hydraulically actuated double-cone friction clutch of a type known per se. Its hub part 3a is connected through metal spring plates 8 to axially movable clutch members 9 having conical outer surfaces which cooperate with conical inner surfaces of the clutch housing 3c. One of the clutch members 9 is screwed to an annular piston 10, the other to an annular disc 11 which has an annular groove 11a, the structure forming an annular piston and cylinder. The annular groove 11a communicates through partly flexible and partly rigid line 12 with a source (not shown) of hydraulic or pneumatic fluid under pressure, through a control valve (also not shown).

The clutch differs from normal double-cone friction clutches in that the hub part 3a, one end of which is attached to one end of the intermediate shaft 7, has a central bore 13. A hollow pin 15 which is attached to the other end of the hub part 3a by an end plate 14 fixed to the clutch housing 3c penetrates into the bore 13. The hub part 3a is supported on the hollow pin 15, and therefore indirectly on the clutch housing 3c, by a roller bearing 16 whose inner ring 16a is mounted on the hollow pin 15 and whose outer ring 16b has a domed outer surface which is formed by an equatorial band of a sphere and which supports a flexible cushion 17 made, for example, of rubber. The inner surface of the hub part 3a rests in contact with the outer surface of the cushion 17. The cushion is quite thin, compared to its axial length. The effect obtained is that when the hub part 3a oscillates pendulum-fashion, due to the other end of the intermediate shaft 7 moving sideways with the engine 1 so that the intermediate shaft 7 assumes a slanting attitude with respect to the shaft 4d, the hub part 3a is supported practically unyieldingly in radial directions through the thin cushion 17 against the hollow pin 15 and thus against the clutch housing 3c.

Figure 3:
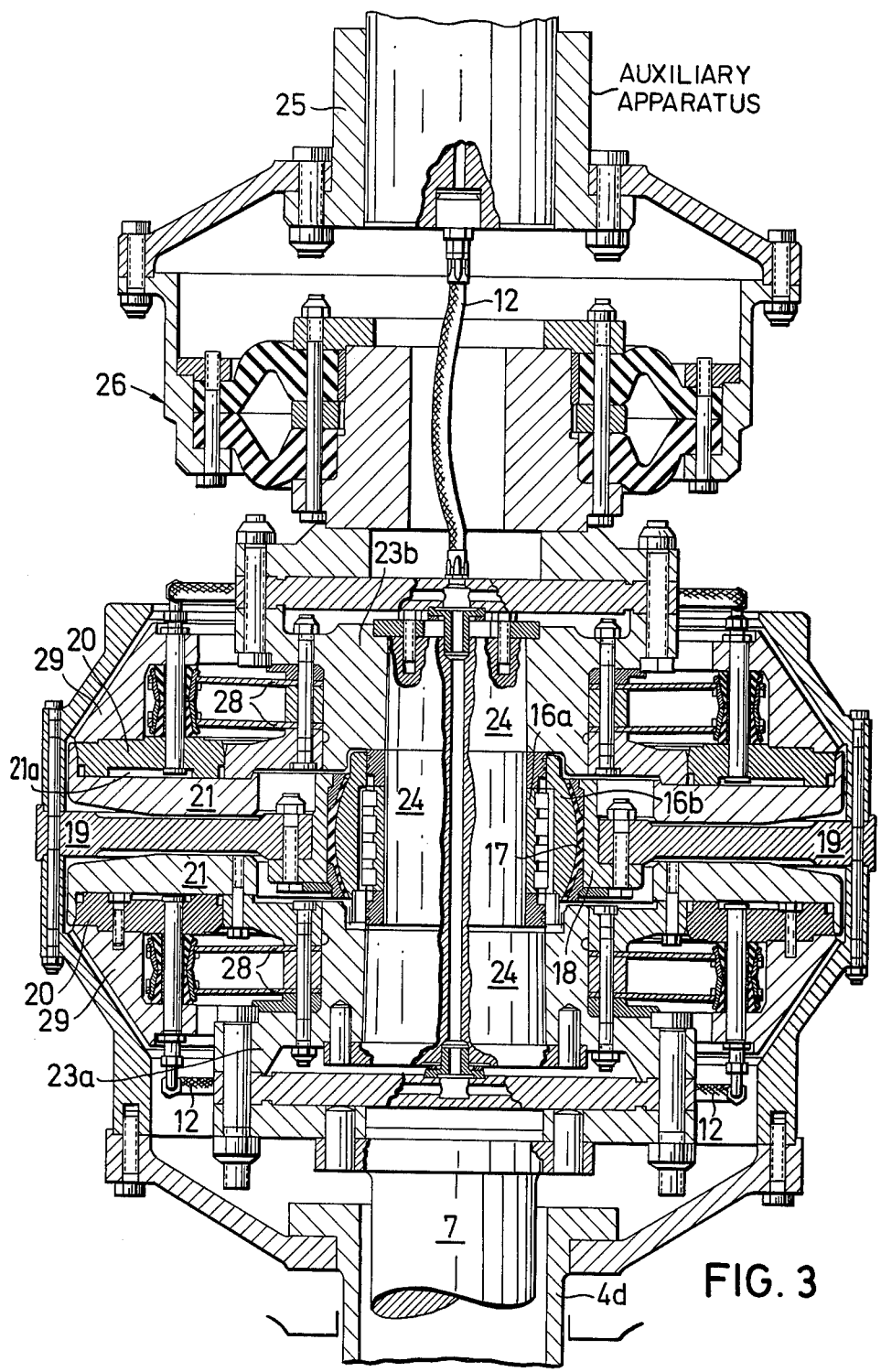

The clutch shown in FIG. 3 differs from the clutch of FIG. 2 in that in the clutch shown in FIG. 3 the hub part consists of two parts 23a and 23b which are spaced apart axially but fixed to each other rigidly by a core shaft 24. Each hub part 23a and 23b is connected through annular spring discs 28 to an axially movable clutch member 29 which has an annular piston 20 cooperating with an annular cylinder consisting of an annular disc 21, fixed to the hub part 23a or 23b and having an annular groove 21a. An annular plate 19 is fixed to the clutch housing 23 and interposed between the two hub parts 23a and 23b. Each hub part is thus supported radially through the core shaft 24 and the roller bearing 16, against the annular plate 19 and thus against the clutch housing 23c. The inner ring 16a of the roller bearing is mounted on the core shaft 24 and the outer ring 16b is supported through the cushion 17. The outer ring 16b again has a domed outer surface formed like an equatorial band from a sphere. The cushion 17 is sandwiched between the domed outer surface of the ring 16b and the inner surface of a cylinder ring 18 attached to the annular plate 19.

The example of the clutch shown in FIG. 3 enables the hub part 23 to be connected to the driving shaft 25 of an auxiliary apparatus which is constantly driven by one of the engines. This connection is preferably made through a flexible coupling 26.

This gives far greater freedom of choice in the arrangement of the auxiliary driven devices, and a considerable saving of space, when compared to conventional practice in which the auxiliary device is driven from the intermediate shaft through a special drive train located in the gear housing.

I claim:

1. In a transmission system for transmitting drive from at least two internal combustion engines to a single driven shaft, a single clutch associated with each said engine, each said clutch having a hub part and a housing part, said housing part carring fixed friction elements, an intermediate shaft connected to said hub part of each clutch and, in use, connected to its associated engine through a flexible coupling, a hollow shaft connected to said housing part of each clutch, said intermediate shaft extending along and through its associated hollow shaft whereby each clutch is remote from its associated engine, a gear housing, each of said hollow shafts passing through said gear housing, a gear wheel fixed to each hollow shaft, a gear train in said gear housing connected to said single driven shaft, said gear wheels on said hollow shafts meshing with said gear train, the improvement wherein said movable friction elements of each clutch are yieldingly connected to said hub part so that they are movable in all directions with respect to said hub part, each of said hollow shafts being rigidly and co-axially connected on said respective housings, a rolling bearing in each of said clutches, each rolling bearing having inner rings fixed to one of said clutch parts, each rolling bearing having outer rings, an axially curved surface on said outer rings, thin resilient cushions covering said curved surface, and said curved outer surface engaging the other clutch parts through said thin resilient cushions, whereby said hub parts of each clutch are centered substantially non-yieldingly in a radial direction on their respective clutch axes to permit small angular movements of said intermediate shafts with respect to said hollow shafts.

2. The transmission system of claim 1, wherein said friction elements of each clutch move axially to engage and disengage each of said clutches and including resilient members which are radially stiff and capable of axial movement to connect said friction elements to said hub parts of each of said clutches, said members permitting actuation of each of said clutches and also allowing small angular movements of said hub parts relative to said clutch housing.

3. The transmission system of claim 2, wherein said resilient members are formed by annular plate springs.

4. In a transmission system for transmitting drive from at least two internal combustion engines to a single driven shaft, a clutch having a hub part carrying the movable friction elements and a housing part carrying the fixed friction elements associated with each engine, an intermediate shaft connected to said hub part of each clutch and, in use, connected to its associated engine through a flexible coupling, a hollow shaft connected to said housing part of each clutch, said intermediate shaft extending along and through its associated hollow shaft whereby each clutch is remote from its associated engine, a gear housing, each of said hollow shafts passing through said gear housing, a gear wheel fixed to each hollow shaft, a gear train in said gear housing connected to said single driven shaft, said gear wheels on said hollow shafts meshing with said gear train, the improvement wherein said movable friction elements of each clutch are connected yieldingly to said hub part so that they are movable in all directions with respect to said hub part of each clutch, each of said hollow shafts being connected rigidly and co-axially on said respective housings, a rolling bearing in each of said clutches having their inner rings fixed to one of said clutch parts, an axially curved surface on their outer rings, thin resilient cushions covering said curved surfaces and said curved outer surfaces engaging the other clutch parts through said thin resilient cushions, whereby said hub parts of each clutch are centered substantially non-yieldingly in a radial direction on their respective clutch axes so that movements of said intermediate shafts through a small solid angle with respect to said hollow shafts are permitted, said friction elements of each clutch being axially movable to engage and disengage each of said clutches and including resilient members which are radially stiff and capable of axial movement to connect said friction elements to said hub parts of each of said clutches, said members permitting actuation of each of said clutches and also allowing small angular movements of said hub parts relative to said clutch housing, a bore being provided in each of said hub parts, a hollow pin extending into each of said bores, each of said pins being fixed to said clutch housings remote from its associated intermediate shaft, and said inner rings of said rolling bearings being mounted on said pin and said curved outer surfaces of said outer rings engaging the wall of said bore through said cushions.

5. The transmission system of claim 2, wherein said hub part of each of said clutches consists of two portions which are mirror images of each other, a core shaft fixing said two portions together in each clutch, annular plate springs connecting said axially movable friction elements to each portion, said plate springs fixed to said hub parts, said core shaft of each of said clutches being fixed to said inner rings of said rolling bearings and, an annular plate fixed to said housing part of each of said clutches engaging said curved surface of said outer rings of said rolling bearings through said thin resilient cushions.

6. The transmission system of claim 5, wherein a driving shaft of an auxiliary device is connected to said hub part of one of said clutches forming an extension of said intermediate shaft.

7. The transmission system of claim 6, wherein a flexible coupling is interposed between said driving shaft of said auxiliary device and said hub part of said one clutch.

8. In a clutch for use in a transmission system, having a hub part and a housing part, including movable friction elements yieldingly connected to said hub part to be movable in all directions with respect to said hub part, fixed friction elements carried by said housing part, and actuating means for moving said movable friction elements with respect to said fixed friction elements to engage and disengage said friction elements, the improvement wherein said clutch includes a rolling bearing having its inner ring fixed to one of said clutch parts, each rolling bearing having an outer ring, an axially curved surface on said outer ring, and a thin resilient cushion engaging said curved outer surface, said curved outer surface engaging said other clutch part through said thin resilient cushion, whereby small angular movements of said hub part with respect to said housing part are permitted.

9. The clutch of claim 8, having two conically shaped friction elements, annular plate springs connected between said movable friction elements and said hub part, said actuating means moving axially during actuation of said clutch, said annular plate springs permitting axial movement of said movable friction elements and permitting small angular movements of said hub part with respect to said housing part.

10. The clutch of claim 9, wherein said actuating means is an annular fluid pressure-operated piston and cylinder assembly arranged to move said movable friction surfaces in an axial direction.

* * * * *